US010175452B2

(12) United States Patent
Suzuki

(10) Patent No.: US 10,175,452 B2
(45) Date of Patent: Jan. 8, 2019

(54) FOCUS DETECTION APPARATUS, CONTROL METHOD, AND STORAGE MEDIUM

(71) Applicant: CANON KABUSHIKI KAISHA, Tokyo (JP)

(72) Inventor: Yasuyuki Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/874,561

(22) Filed: Jan. 18, 2018

(65) Prior Publication Data

US 2018/0203204 A1  Jul. 19, 2018

(30) Foreign Application Priority Data

Jan. 19, 2017  (JP) .................. 2017-007239
Dec. 6, 2017  (JP) .................. 2017-234608

(51) Int. Cl.
| | | |
|---|---|---|
| H04N 5/247 | (2006.01) |
| G02B 7/38 | (2006.01) |
| G03B 13/36 | (2006.01) |
| H04N 5/232 | (2006.01) |
| G06T 7/70 | (2017.01) |

(52) U.S. Cl.
CPC ............ *G02B 7/38* (2013.01); *G03B 13/36* (2013.01); *G06T 7/70* (2017.01); *H04N 5/23212* (2013.01); *H04N 5/247* (2013.01); *G06T 2207/30201* (2013.01)

(58) Field of Classification Search
CPC ...... G02B 7/38; H04N 5/247; H04N 5/23212; G03B 13/36; G06T 7/70; G06T 2207/30201
See application file for complete search history.

(56) References Cited

U.S. PATENT DOCUMENTS

| | | | | |
|---|---|---|---|---|
| 7,283,163 B1* | 10/2007 | Noda | ................ | G02B 7/34 348/243 |
| 2011/0052168 A1* | 3/2011 | Sakaguchi | ............. | G03B 13/32 396/96 |
| 2013/0162890 A1* | 6/2013 | Suzuki | ............... | H04N 5/23212 348/350 |
| 2013/0182172 A1* | 7/2013 | Suzuki | .................. | G02B 7/28 348/345 |
| 2014/0218596 A1* | 8/2014 | Shu | .................. | H04N 5/23212 348/353 |
| 2015/0249784 A1* | 9/2015 | Suzuki | .............. | H04N 5/23212 348/298 |
| 2017/0041526 A1* | 2/2017 | Suzuki | .................. | G03B 13/36 |

FOREIGN PATENT DOCUMENTS

JP  2011-48265 A  3/2011

* cited by examiner

*Primary Examiner* — Shahbaz Nazrul
(74) *Attorney, Agent, or Firm* — Canon USA Inc., IP Division

(57) ABSTRACT

A microcomputer controls accumulation of a signal by an AF sensor based on an AF area corresponding to a subject among a plurality of regions in the AF sensor that corresponds to each of AF areas. A setting unit sets the region corresponding to a position of a subject that should be in focus among the plurality of regions. A focus detection unit carries out focus detection based on the signal acquired from the control, the control being based on a light reception amount in a reference region set by the setting unit.

9 Claims, 15 Drawing Sheets

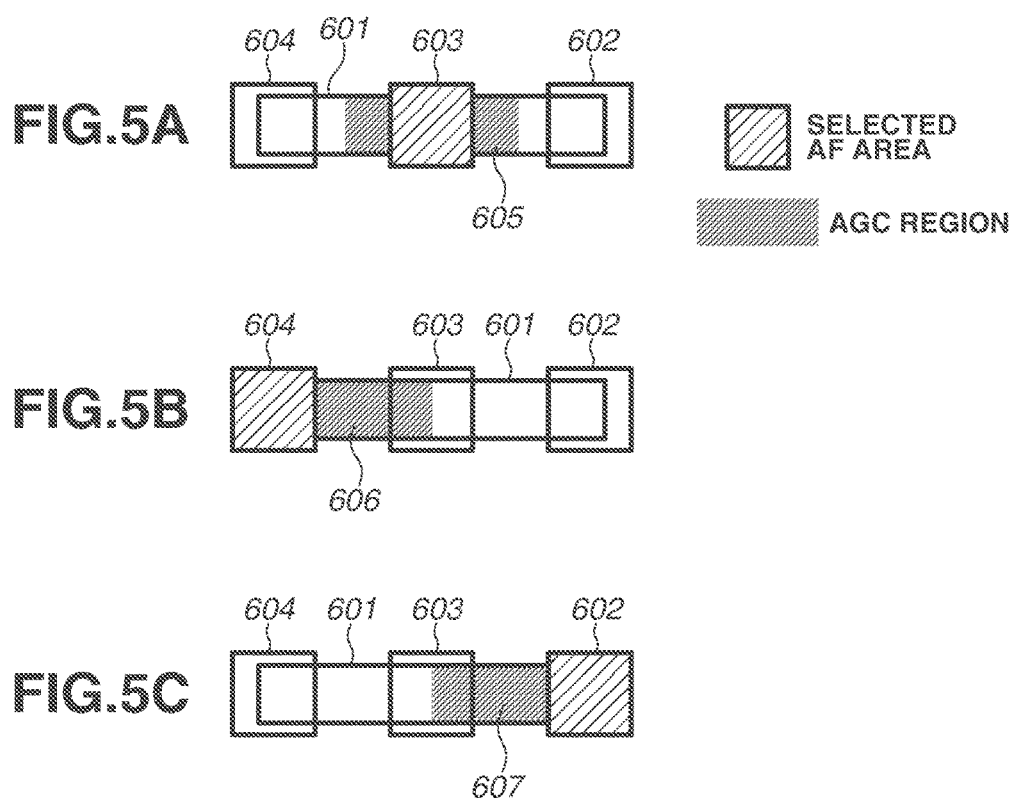

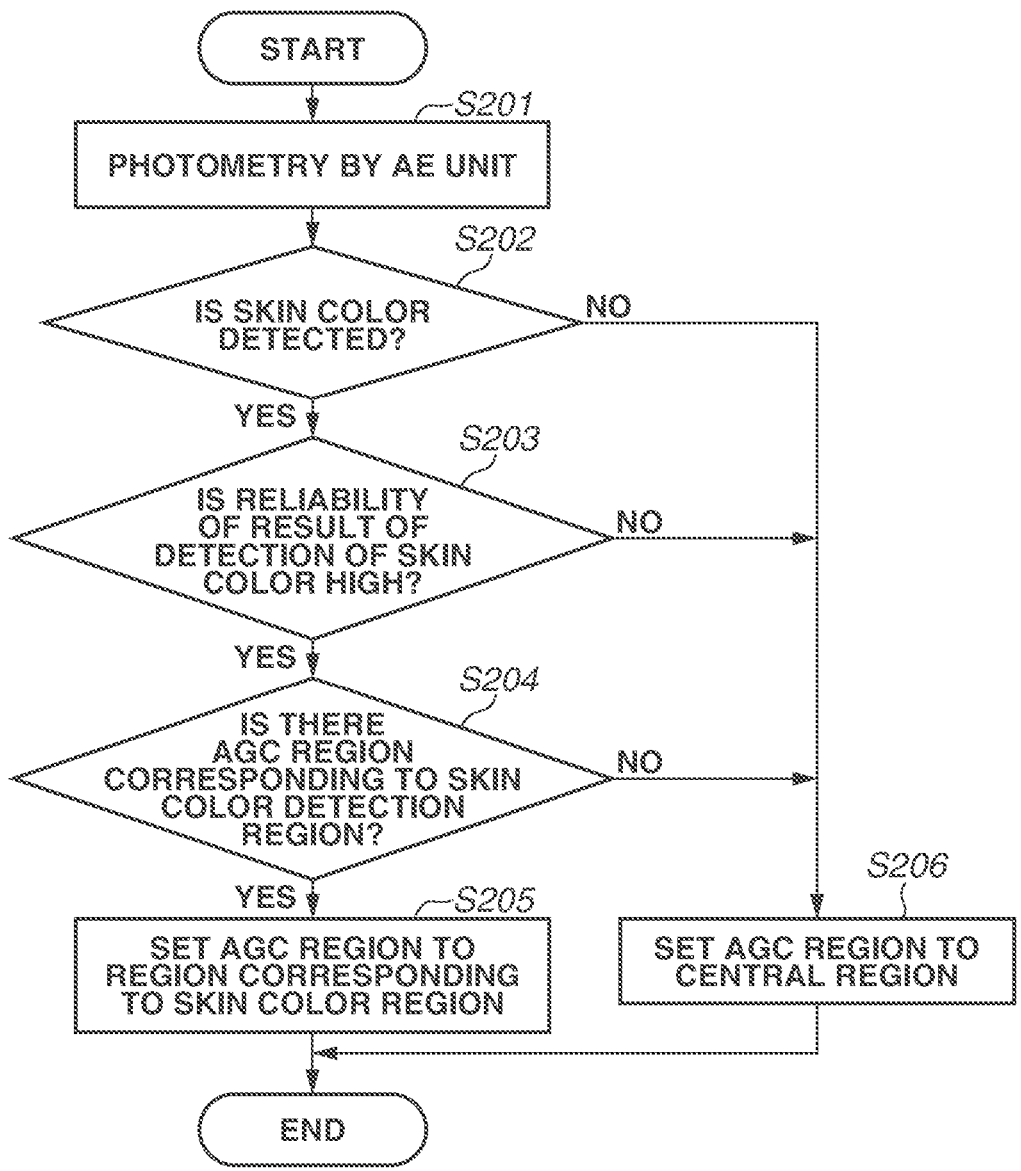

AGC REGION AND SELECTED AF AREA
WHEN FOCUS DETECTION HAS
BEEN CARRIED OUT LAST TIME

▨ SELECTED AF AREA

▨ AGC REGION

AGC REGION WHEN
FOCUS DETECTION IS
CARRIED OUT THIS TIME

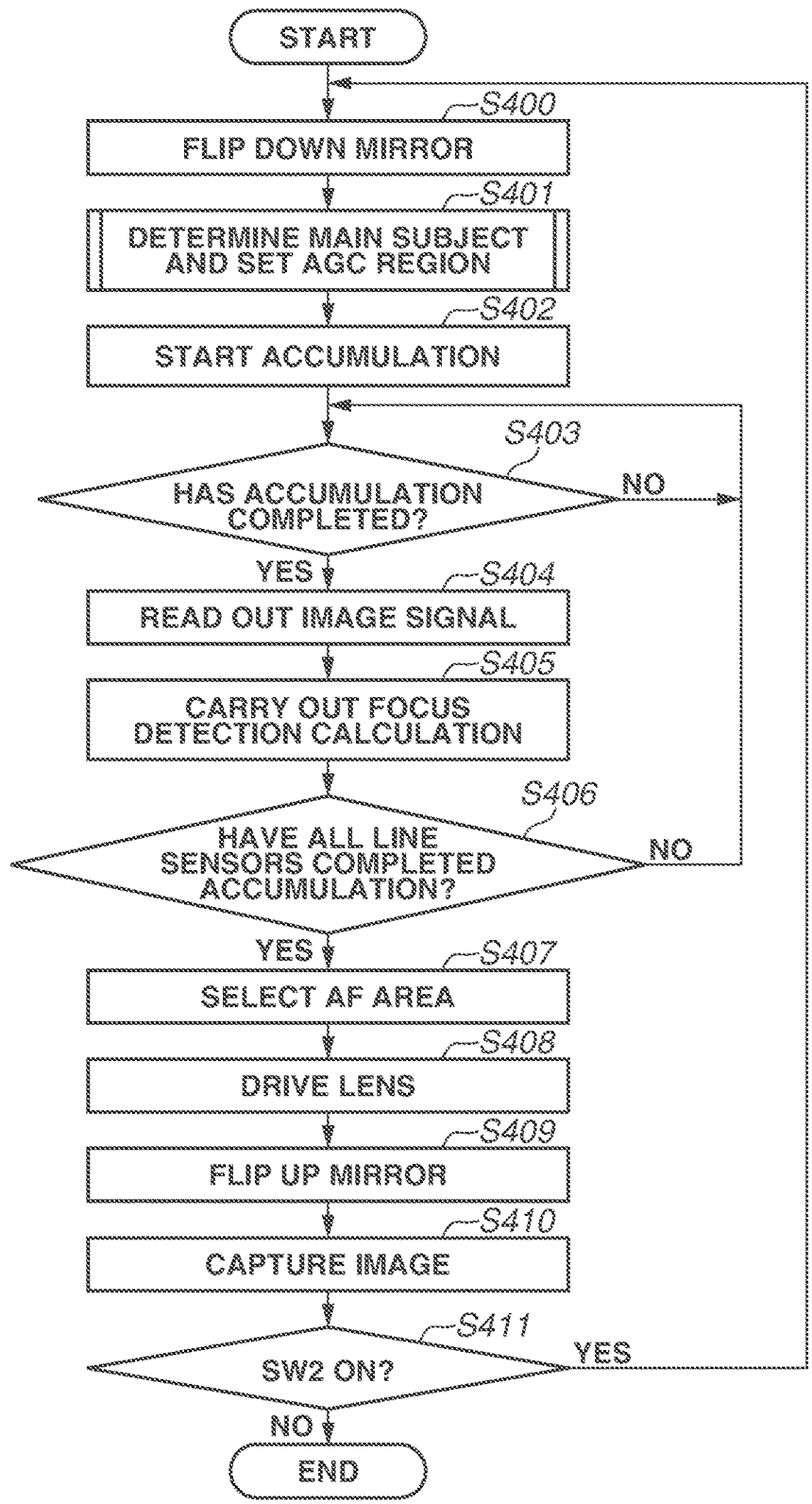

AGC REGION WHEN FOCUS DETECTION HAS BEEN CARRIED OUT TIME BEFORE LAST

AGC REGION WHEN FOCUS DETECTION HAS BEEN CARRIED OUT LAST TIME

AGC REGION WHEN FOCUS DETECTION IS CARRIED OUT THIS TIME

ARBITRARY SELECTION

ZONE SELECTION

AUTOMATIC SELECTION

☐ USED FOCUS POINT
▫ UNUSED FOCUS POINT
⬚ LINE SENSOR

TYPE A

TYPE B

TYPE C

FOCUS DETECTION APPARATUS, CONTROL METHOD, AND STORAGE MEDIUM

BACKGROUND OF THE INVENTION

Field of Invention

The present invention relates to a focus detection apparatus that carries out focus detection by using a signal output from a line sensor.

Description of Related Art

Conventionally, regarding a line sensor included in a module for autofocus (AF), there has been known a technique of controlling signal accumulation by the entire line sensor based on a light reception amount in a region of the line sensor that corresponds to some AF areas among a plurality of AF areas corresponding to one line sensor.

Japanese Patent Application Laid-Open No. 2011-48265 discusses the following technique. Three AF areas correspond to one line sensor, and the line sensor is divided into three regions in correspondence with each of the AF areas. In a mode of automatically selecting the AF area, the signal accumulation by the entire line sensor is controlled based on a light reception amount in a region in the line sensor that corresponds to a central AF area among the three AF areas. Then, a result of the focus detection using an output signal of the region in the line sensor based on which the signal accumulation is controlled is preferentially selected as an AF area for determining an in-focus state.

According to Japanese Patent Application Laid-Open No. 2011-48265, when a subject that a user wants to focus on is located at a position corresponding to the central AF area among the plurality of AF areas, a signal suitable to accurately carry out the focus detection with respect to the subject can be acquired due to the signal accumulation control. However, Japanese Patent Application Laid-open No. 2011-48265 fails to take into consideration such a situation that the subject is located at a position corresponding to an AF area other than the central AF area among the plurality of AF areas. Therefore, even when the subject that the user wants to focus on is not located at the center but is located at a position corresponding to a left or right AF area, the signal accumulation by the entire line sensor is controlled based on the light reception amount in the region in the line sensor that corresponds to the central AF area where the subject is not located. For this reason, the presence of the subject at the position corresponding to the left or right AF area may result in a failure to perform the signal accumulation control appropriate for accurately carrying out the focus detection with respect to the subject that the user wants to focus on. For example, it is supposed that the subject that the user wanes to focus on is located at the position corresponding to the left AF area and a bright background is located at the position corresponding to the central AF area. The type of consequence brought about in this case will be described below. In this case, the signal accumulation is controlled so as to set the central bright background into an appropriate accumulation state, and therefore is controlled so as to shorten an accumulation time period or reduce a gain of the entire line sensor. Therefore, the level of a signal to be output from the region in the line sensor that corresponds to the left AF area that the user wants to focus on is undesirably low. This leads to a difficulty in the correct focus detection with respect to the subject that the user wants to focus on, such as destabilization of the result of the focus detection due to a reduction in contrast of the output signal, and a failure to carry out the focus detection in the first place.

SUMMARY OF INVENTION

A focus detection apparatus capable of performing signal accumulation control suitable to focus detection regardless of the area of detection is disclosed. Further, a control method, and a non-transitory storage medium storing a program are also disclosed.

According to an aspect of the present disclosure, a focus detection apparatus includes a first image sensor including line sensors each having a plurality of photoelectric conversion elements and configured to receive a pair of different light fluxes among light fluxes passing through an imaging optical system, to output an image signal, an accumulation control unit configured to control accumulation of the image signal by each of the line sensors, a focus detection unit configured to establish a correspondence of an AF area with each of a plurality of regions in each of the line sensors and detect a defocus amount of each of the plurality of regions based on the image signal of each of the plurality of regions, and a setting unit configured to set the region corresponding to a position of a subject that should be in focus among the plurality of regions, as a reference region for the control of the accumulation of the image signal by the accumulation control unit. The focus detection unit is configured to detect the defocus amount based on the signal acquired from the control of the accumulation by the accumulation control unit, the control of the accumulation being based on a light reception amount in the reference region set by the setting unit.

Further features of the present disclosure will become apparent from the following description of exemplary embodiments with reference to the attached drawings.

BRIEF DESCRIPTION OF THE DRAWINGS

FIGS. 5A, 5B, and 5C illustrate a relationship between an autofocus (AF) area and the AGC region.

FIG. 6 is a flowchart illustrating a determination of a main subject and the setting of the AGC region according to the first exemplary embodiment.

FIG. 9 is a flowchart illustrating an imaging operation according to a third exemplary embodiment.

DESCRIPTION OF THE EMBODIMENTS

In the following description, a first exemplary embodiment embodying the present disclosure will be described.

Configuration of Camera

Figure 1:
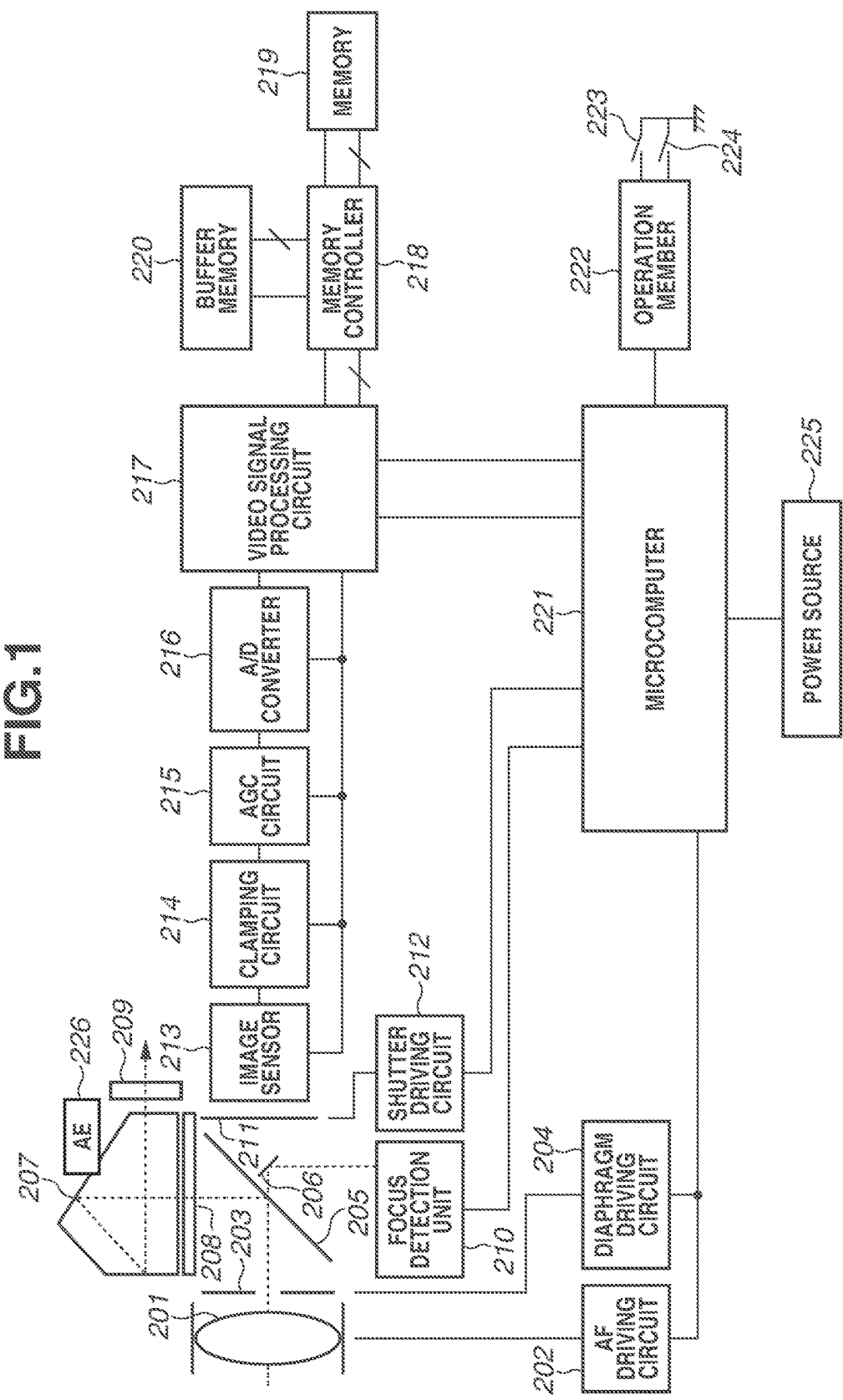
FIG. 1 is a block diagram illustrating a configuration of a single-lens reflex camera.

FIG. 1 is a block diagram, illustrating a configuration of a single-lens reflex (SLR) camera according to the first exemplary embodiment.

An imaging optical system according to the first exemplary embodiment includes, but is not limited to, an imaging lens 201, and a diaphragm 203. The imaging optical system includes other known elements which are not shown for the sake of simplicity of the drawing.

An autofocus (AF) driving circuit 202 includes, for example, a non-illustrated direct-current (DC) motor or ultrasonic motor. The AF driving circuit 202 focuses the camera by changing a focus lens position of the imaging lens 201 under control by a microcomputer 221.

A diaphragm driving circuit 204 drives the diaphragm 203 under control by the microcomputer 221. An amount by which the diaphragm 203 should be driven is calculated by the microcomputer 221. Accordingly, the diaphragm 203 changes an optical aperture value according to an amount calculated by the microcomputer 221.

A main mirror 205 is an optical member for switching a light flux incident from the imaging lens 201 between a finder side and an image sensor side. The main mirror 205 is normally disposed so as to reflect the light flux so as to guide the light flux to a viewfinder unit. The main mirror 205 jumps up to be retracted from the light flux path, so that the light flux can pass to an image sensor 213 when imaging is carried out. Further, the main mirror 205 is configured as a half mirror so as to permit the light flux to be partially transmitted therethrough at a central portion thereof.

A sub mirror 206 reflects the light flux transmitted through the main mirror 205 to cause the light flux to partially enter a focus detection unit 210. The focus detection unit 210 is a module for focus detection, and the received by a pair of AF sensors 230a and 230b (shown in FIG. 2) included in the focus detection unit 210. The AF sensors 230a and 230b are each a line sensor. In the present exemplary embodiment, the focus detection unit 210 will be described picking up only one pair of AF sensors, but may include a plurality of pairs of AF sensors. The focus detection unit 210 includes a circuit (not illustrated) for, for example, accumulating, monitoring, reading out, and carrying out a calculation for the focus detection on image signals photoelectrically converted by the AF sensors 230a and 230b.

A viewfinder unit includes a pentaprism 207, a focusing plate 208, an eyepiece 209, and the like.

The light flux transmitted through the central portion of the main mirror 205 and reflected by the sub mirror 206 reaches the pair of AF sensors 230a and 230b. The AF sensors 230a and 230b are disposed inside the focus detection unit 210, which is the module for AF, for carrying out the photoelectric conversion of the light flux. The AF sensors 230a and 230b according to the present exemplary embodiment are each an array of photoelectric conversion elements arranged one-dimensionally (in the form of a line). A defocus amount indicating a focus adjustment state of the imaging lens 201 with respect to a subject is acquired by calculating outputs of the pair of AF sensors 230a and 230b. The microcomputer 221 evaluates a result of the calculation and instructs the AF driving circuit 202, thereby driving the focus lens.

A shutter driving circuit 212 drives a focal plane shutter 211. A time period during which the shutter 211 is open is controlled by the microcomputer 221.

A charge coupled device (CCD) sensor, a complementary metal-oxide semiconductor (CMOS) sensor, or the like is used as the image sensor 213, and the image sensor 213 converts a subject image formed by the imaging lens 201 into an electric signal.

A clamping circuit 214 and an automatic gain control (AGC) circuit 215 perform basic analog signal processing before an analog-to-digital (A/D) conversion is carried out on the electric signal output from the image sensor 213. A clamping level and an AGC reference level are changed by the microcomputer 221.

An A/D converter 216 converts an analog output signal of the image sensor 213 into a digital signal.

A video signal processing circuit 217 is realized by a logical device, such as a gate array. The video signal processing circuit 217 performs filter processing, color conversion and gamma processing, and also performs compression such as Joint Photographic Experts Group (JPEG) compression on the digitized image signal, and outputs a result thereof to a memory controller 218.

The video signal processing circuit 217 can output information such as exposure information and white balance of the signal of the image sensor 213 to the microcomputer 221 as necessary. The microcomputer 221 issues instructions for the white balance and a gain adjustment based on these pieces of information. Continuous imaging is carried out by first storing imaging data into a buffer memory 220 while keeping the image unprocessed, reading out the unprocessed image data via the memory controller 218, and performing the image processing and/or the compression processing by the video signal processing circuit 217. The number of images to be captured by the continuous imaging depends on a capacity of the buffer memory 220.

The memory controller 216 stores the unprocessed digital image signal input from the video signal processing circuit 217 into the buffer memory 220, and stores the processed digital image signal into a memory 219. Further, conversely, the memory controller 221 outputs the image signal from the buffer memory 220 or the memory 219 to the video signal processing circuit unit 217. The memory 219 may be a removable (detachable) memory.

An operation member 222 allows a user to interact with the camera, and notifies the microcomputer 221 of a state thereof, and the microcomputer 221 controls each of the units according to a change in this operation member 222.

Further, the operation member 222 can switch a mode to a ONE SHOT mode suitable to image a stationary subject and a SERVO mode suitable to image a subject located at a continuously changing imaging distance.

A switch SW1 (hereinafter also referred to as SW1) and a switch SW2 (hereinafter also referred to as SW2) are turned on and off according to an operation on a release button, and each of them is one of input switches of the operation member 222. A state in which only SW1 is turned on corresponds to a state in which the release button is half pressed, and an autofocus operation and a photometric operation are performed in this state.

A state in which both the switches SW1 and SW2 are turned on corresponds to a state in which the release button is fully pressed, and a state in which the release button for recording the image is turned on. The imaging is carried out in this state. Further, while the switches SW1 and SW2 are kept turned on, the continuous imaging is performed. Besides them, switches (not illustrated) such as an International Organization for Standardization (ISO) setting button, an image size setting button, an image quality setting button, and an information display button are connected to the operation member 222, and states of the switches are detected.

A power source unit 225 supplies a required power source to each integrated circuit (IC) and driving system. The power source unit 225 may include a removable battery, or an external power source.

An automatic exposure (AE) unit 226 measures a luminance of the subject when the subject is viewed through the imaging lens 201. The AE unit 226 includes a photometric sensor (a second image sensor) formed by an image sensor such as a CCD or a CMOS, and a circuit (not illustrated) that performs a photometric calculation and subject recognition such as a face detection calculation and a tracking calculation, by using an output signal from the photometric sensor. The photometric sensor includes a pixel group formed by a plurality of pixels (red (R), green (G), blue (B), and infrared (IR)) having different spectral characteristics in an infrared light range and a visible light range.

Focus Detection Optical System based on Phase Difference Method

Figure 2:
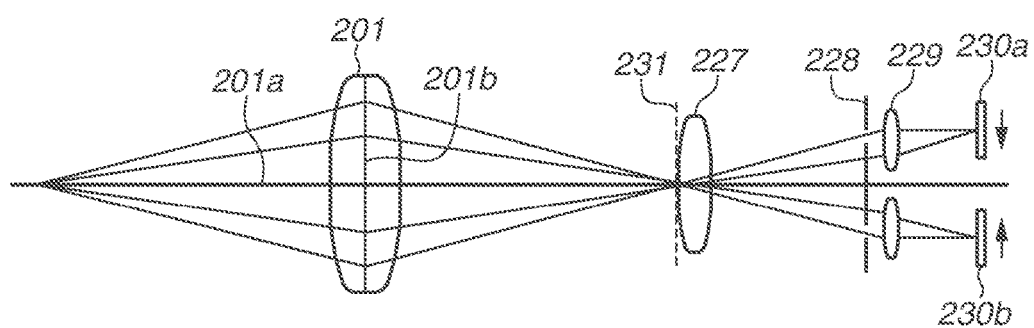
FIG. 2 illustrates a configuration of a focus detection optical system based on a phase difference method.

FIG. 2 illustrates an optical configuration of a focus detection system showing a light flux incident on the focus detection unit 210. The same reference numerals used in FIG. 1 are used for the components of FIG. 2 that have the same function as the components illustrated in FIG. 1. Further, FIG. 2 illustrates each of the components of the focus detection system arranged along an optical axis 201a of the imaging lens 201. However, FIG. 2 illustrates the optical configuration with the main mirror 205 and the sub mirror 206 omitted therefrom.

The focus detection unit 210 includes a field lens 227, a diaphragm 228 having a pair of openings, secondary imaging lenses 229, and the AF sensors 230a and 230b, which are a pair of photoelectric conversion element arrays.

The light flux emitted from one light source on an optical axis 201a passes through the imaging lens 201 and is imaged on an imaging plane 231 as primary imaging. Then, the light flux is imaged, as secondary imaging, on the pair of AF sensors 230a and 230b with a certain interval generated therebetween via the field lens 227, the diaphragm 228, and the pair of secondary imaging lenses 229. The AF sensors 230a and 230b each photoelectrically converts the received light flux and outputs an image signal.

The field lens 227 is disposed in such a manner that the light flux is imaged on a pupil 201b of the imaging lens 201 and an incident pupil of the pair of secondary imaging lenses 229, i.e., around the diaphragm 228, and divides the pupil 201b of the imaging lens 201 in a vertical direction in FIG. 2 in correspondence with the pair of openings of the diaphragm 228.

In such a configuration, for example, if the imaging lens 201 is moved forward to the left in FIG. 2 and the image of the light flux is formed on the left side of the imaging plane 231, a pair of subject images on the pair of AF sensors 230a and 230b is displaced in directions indicated by arrows pointing towards the optical axis. The focus detection of the imaging lens 201, and further, the focus adjustment driving of the imaging lens 201 can be carried out by detecting a relative displacement amount between the pair of subject images with use of the signals photoelectrically converted by the AF sensors 230a and 230b. If the imaging lens 201 is moved backward to the right in FIG. 2, the pair of subject images on the pair of AF sensors 230a and 230b is displaced in opposite directions from the directions indicated by the arrows in FIG. 2.

The focus detection unit 210 (an accumulation control unit) performs AGC control with respect to the AF sensors 230a and 230b. The AGC control refers to control of comparing an accumulated signal and a predetermined signal level, and stopping the accumulation operation when the accumulated signal reaches the predetermined signal level.

The focus detection of the imaging lens 201 is carried out with use of an output of the focus detection unit 210 configured in this manner.

Imaging Operation

First, an imaging operation according to the present exemplary embodiment will be described with reference to a flowchart illustrated in FIG. 3.

In step S101, the microcomputer 221 determines a position of a main subject. Then, the microcomputer 221 sets an AGC region (also referred to as a reference region) in the line sensor according to the detected position of the main subject on an imaging screen. The AGC region according to the present exemplary embodiment refers to a region in the line sensor based on which the accumulation of the signal by the line sensor is controlled in the above-described AG control. In other words, the accumulation of the signal by the line sensor is controlled based on a light reception amount in the region. The light reception amount can be measured by monitoring an output signal of the region based on which the signal accumulation is controlled. For example, the signal accumulation is controlled in such a manner that the line sensor accumulates the signal until the output signal of the region based on which the signal accumulation is controlled reaches the predetermined level. Now, the output signal to be monitored may be, for example, a differential signal between a largest signal and a smallest signal among pixel signals in the region based on which the signal accumulation is controlled. The determination of the main subject and the setting of the AGO region in step S101 will be described below.

In step S102, the microcomputer 221 controls the focus detection unit 210 to start the control of the accumulation by the line sensor based on the setting of the AGC region in step S101. Then, the processing proceeds to step S103.

In step S103, the focus detection unit 210 monitors completion of the accumulation by the line sensor. If there is a line sensor that has completed the accumulation (YES in step S103), the processing proceeds to step S104. On the other hand, if there is no line sensor that has completed the accumulation in step S103 (NO in step S103), the determination in step S103 is repeated.

In step S104, the focus detection unit 210 reads out the image signal.

In step S105, the focus detection unit 210 (a focus detection unit) carries out the focus detection calculation based on the image signal read out in step S104, thereby detecting a focus state (a defocus amount) of the imaging optical system. Then, the processing proceeds to step S106.

In step S106, the microcomputer 221 determines whether all of line sensors for which the microcomputer 221 had instructed the focus detection unit 210 to accumulate the image signal have completed the accumulation. If all of the line sensors have completed the accumulation (YES in step S106), the processing proceeds to step S107. On the other hand, if the microcomputer 221 determines that not all of the line sensors have completed the accumulation in step S106 (NO in step S106), the processing returns to step S103. S103 to S106 are repeated until all of the line sensors have completed the accumulation (YES in step S106).

In step S107, the microcomputer 221 (a selection unit) selects an AF area based on the defocus amount detected in step S105. In the present exemplary embodiment, the computer 221 automatically selects the AF area (an automatic selection mode).

After the selection of the AF area is ended in step S107, in step S108, the microcomputer 221 performs control so as to drive the lens based on the defocus amount in the selected AF area via the AF driving circuit 202. Then, the processing proceeds to step S109.

In step S109, the microcomputer 221 performs control so as to flip up the mirror 205. Then, the processing proceeds to step S110, in which the microcomputer 221 performs control so as to carry out the imaging. Then, the present flow is ended.

Determination of Main Subject and Setting of AGC Region

In the present exemplary embodiment, the microcomputer 221 determines the position of the main subject that the user wants to image, and sets the AGC region in the AF sensor so as to correspond to the position of the main subject. First, the determination of the main subject and the setting of the AGC region will be described.

Figure 4:
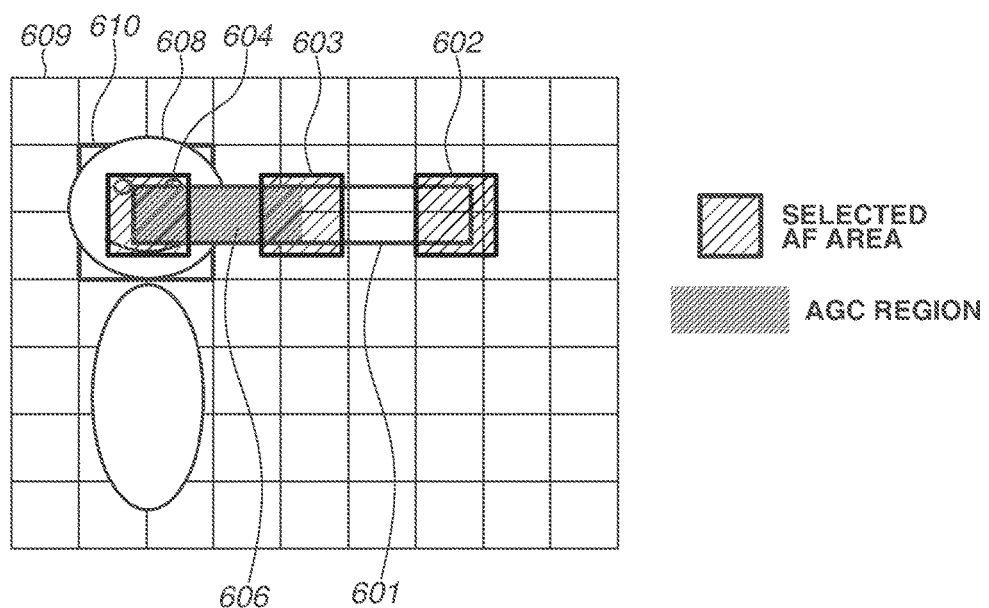
FIG. 4 illustrates a setting of an automatic gain control (AGC) region according to the first exemplary embodiment.

In the first exemplary embodiment, the microcomputer 221 determines the position of the main subject based on color information detected by the photometric sensor (the second image sensor) included in the AE unit 226, and the microcomputer 221 (a setting unit) sets the AGC region with respect to the position of the main subject that is detected by the AE unit 226. This processing will be described now with reference to FIG. 4. FIG. 4 illustrates a pixel group 609 of the AE unit 226 and an AF sensor 601 while overlapping them. Hereinafter, drawings illustrating the AGC region will be described, using an image formed by back-projecting an image formed on the sensor plane of the focus detection unit 210 on the primary imaging plane. The description of the present exemplary embodiment will continue, indicating an example in which three AF areas (602, 603, and 604) are provided on the AF sensor 601. In FIG. 4, a subject 608, which is the main subject, is located at a position corresponding to the AF area 604.

The AE unit 226 is a color sensor formed by the pixel group 609 including the plurality of pixels (R, G, B, and IR in the present exemplary embodiment) having the different spectral characteristics in the infrared light range and the visible light range. A method of detecting a range containing the color that is the same as a specific color sampled in advance, from photometric outputs of R, G, and B acquired from the photometric sensor of the AE unit 226 is well known, and therefore a description thereof will be omitted in the present exemplary embodiment. Information indicating the presence of human skin within an image can be detected by using the output of the AE unit 226. Further, the presence of a face within an image can also be detected from features of an eye and a mouth in the skin detected by the AE unit 226, and a body below the face can also be detected if the face can be detected. These pieces of detection information are acquired from the output obtained when the AE unit 226 meters the light while the mirror 205 stays down.

The above-described determination of the main subject is carried out with use of the above-described detection information from the AE unit 226. In the following description, the determination of the main subject and the setting of the AGC region will be described with reference to FIGS. 4 and 5.

FIG. 4 illustrates an outline of the determination of the main subject. As illustrated in FIG. 4, the three AF areas 602, 603, and 604 are provided on the line sensor 601, and the focus detection is carried out with respect to all of the three AF areas.

Before the AGC region is set, the AE unit 226 meters the light while the mirror 205 stays down. When the presence of a person is detected, for example, by analyzing skin color, which is a feature color of the person 608 acquired from the AE unit 226, the AGC region in the line sensor 601 is set to a left region 606 in FIG. 5B, so as to overlap a skin color detection region 610. If the subject 608 is detected at a position corresponding to the AF area 603 with respect to the line sensor 601, the AGC region is set to a central region 605 as illustrated in FIG. 5A. On the other hand, if the subject 608 is detected at a position corresponding to the AF area 602 with respect to the line sensor 601, the AGC region is set to a right region 607 as illustrated in FIG. 5C.

The microcomputer 221 performs control so as to realize the above-described processing, thereby allowing the focus detection unit 210 to perform accumulation control appropriate for the main subject. The focus detection unit 210 can acquire an accurate result of the focus detection by using the image signal acquired from the appropriate accumulation control for the focus detection.

Flow of Determination of Main Subject and Setting of AGC Region

FIG. 6 is a flowchart illustrating the determination of the main subject and the setting of the AGC region according to the first exemplary embodiment.

In step S201, the photometric sensor of the AE unit 226 meters the light at a timing that the mirror 205 stays down. Then, the processing proceeds to step S202.

In step S202, the microcomputer 221 (a subject detection unit) detects the skin color based on the output of the photometric sensor acquired in step S201, and is notified of a result thereof. If the microcomputer 221 is notified of the detection of the skin color in step S202 (YES in step S202), the processing proceeds to step S203. If the microcomputer 221 is not notified of the detection of the skin color (NO in step S202), the processing proceeds to step S206, in which the microcomputer 221 sets the central region 605 in the line sensor 601 as the AGC region. Then, the present flow is ended.

In step S203, the microcomputer 221 determines whether reliability of the detection result of the skin color that the microcomputer 221 has been notified of in step S202 is high. If the microcomputer 221 determines that the reliability of the detection result of the skin color is high (YES in step S203), the processing proceeds to step S204. On the other hand, if the microcomputer 221 determines that the reliability of the detection result of the skin color is low (NO in step S203), the processing proceeds to step S206. The reliability of the detection result of the skin color can be determined by a known method. Now, the detection result of the skin color refers to information such as a similarity with the feature color and a distance to the feature color, and a shape, a density, and a size of the skin color.

In step S204, the microcomputer 221 determines whether there is an AGC region in the line sensor 601 that corresponds to the skin color detection region 610 detected in step S202. If there is a corresponding region in step S204 (YES in step S204), the processing proceeds to step S205, in which the microcomputer 221 sets the region in the line sensor 601 that corresponds to the skin color detection region 610, as the AGC region. Then, the present flow is ended. On the other hand, if the microcomputer 221 determines that there is no AGC region in the line sensor 601 that corresponds to the skin color detection region 610 in step S204 (NO in step S204), the processing proceeds to step S206.

Effect of First Exemplary Embodiment

In the above-described manner, in the first exemplary embodiment, the AGC region is set so as to overlap the region where the skin color is detected by the AE unit 226. The setting allows the focus detection unit 210 to perform signal accumulation control appropriate for a human, thereby acquiring a signal further suitable to the focus detection with respect to the human. The focus detection unit 210 can acquire a further accurate result of the focus detection by using the signal.

Exemplary Modification

The information that the microcomputer 221 is notified of from the AE unit 226 has been described as the skin color detection information, but a human silhouette may be detected. When the human face or the human silhouette is sampled, the AGC region may be set to a region where the human face or the human silhouette is detected. Even in this case, the focus detection unit 210 can perform the signal accumulation control appropriate for the human, thereby acquiring the signal further suitable to the focus detection with respect to the human and thus acquiring the further accurate result of the focus detection.

Further, when the photometric operation and the focus detection are performed in parallel with each other, the microcomputer 221 may determine an AGC control, range in the line sensor 601 by using the skin color detection information acquired last time as the skin color detection information acquired from the AE unit 226. This arrangement can improve a speed of processing in which the photometric operation and the focus detection are performed in parallel with each other.

Further, the microcomputer 221 may perform control so as to set the AGC region in the line sensor 601 based on the skin color detection information only when the reliability of the detection result of the skin color that is acquired from the AE unit 226 is determined to be high. This can prevent the signal accumulation control from being performed based on an unintended subject.

In the following description, a second exemplary embodiment will be described. The second exemplary embodiment will be described, omitting a similar description to the first exemplary embodiment and focusing on a difference from the first exemplary embodiment.

In the second exemplary embodiment, the camera is configured basically similar to the first exemplary embodiment. The present exemplary embodiment will be described, referring to an example in which the main subject is determined based on information other than the color information of the main subject such as the human face and the skin color. Therefore, in the present exemplary embodiment, the AE unit 226 may be a sensor that does not acquire the color information and acquires only luminance information.

Determination of Main Subject and Setting of AGC Region

In the second exemplary embodiment, the focus detection unit 210 determines the position of the main subject based on an AF area selected when the focus detection has been carried out last time, and sets the AGC region with respect to the determined position of the main subject.

Figure 7A:
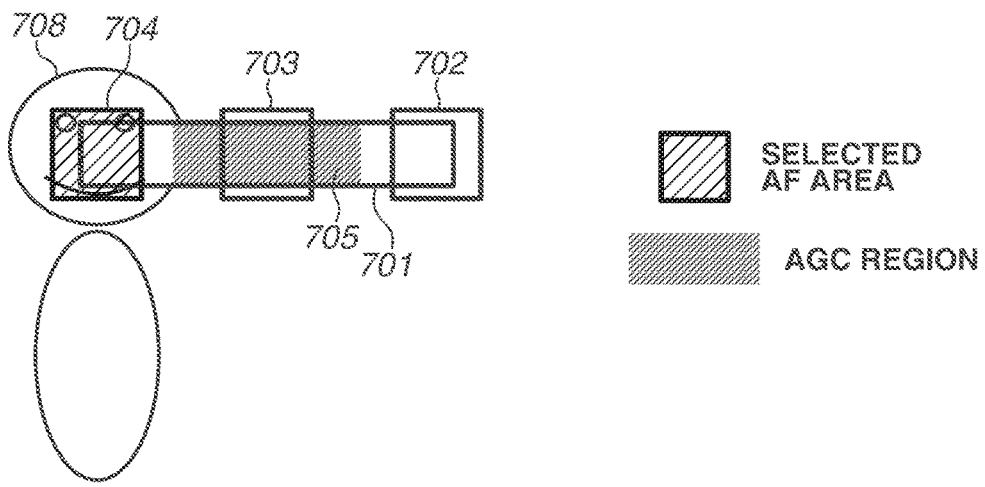
FIGS. 7A and 7B each illustrate a setting of the AGC region according to a second exemplary embodiment.
Figure 7B:
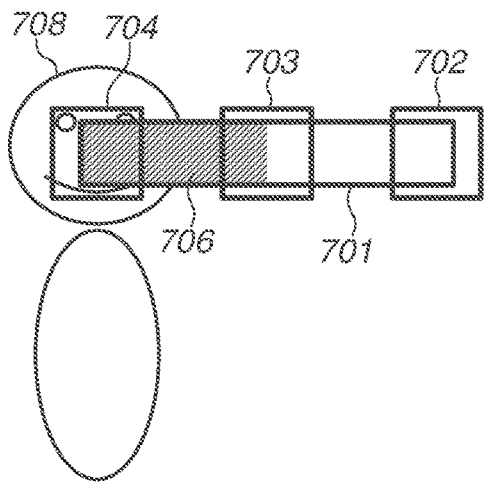

FIGS. 7A and 7B each illustrate the setting of the AGC region in the line sensor according to the present exemplary embodiment. FIG. 7A illustrates the setting of the AGC region for the focus detection carried out last time, and the AF area selected by the microcomputer 221 after the focus detection.

In this example, it is supposed that the focus detection has been carried out for the first time when the focus detection has been carried out last time. At which position an imaged subject 708 is located in the AF area is unknown at the time of the setting of the AGC region for the focus detection carried out for the first time. Therefore, a region 705 in the line sensor that corresponds to a central AF area 703 is set as the AGC region.

After the AGC region is set, the line sensor starts the accumulation. The focus detection unit 210 carries out the focus detection calculation with use of the output of the line sensor, thereby calculating the defocus amount. An AF area 704 where the main subject 708 that the user wants to image is located is selected as the selection AF area by the microcomputer 221 based on the calculated defocus amount. However, the AGC region is not the region corresponding to the AF area 704 but is the region 705 corresponding to the cannot be appropriately performed compared to when the region corresponding to the AF area 704 is set as the AGC range.

Subsequently, FIG. 7B illustrating when the focus detection is carried out next will be described. When the focus detection is carried out next, the subject 708 is highly likely to be located in the left AF area 704 according to the result obtained when the focus detection has been carried out last time, so that the microcomputer 221 sets a region 706 corresponding to the AF area 704 as the AGC region. After the AGC region is set, the line sensor starts accumulation, and the focus detection is carried out. At this time, the AF area 704 where the main subject 708 that the user wants to image is located is reselected as the selection AF area based on the result of the focus detection, based on the result of the focus detection with respect to the AF area 704 acquired from the focus detection at this time, the region 706 corresponding to the position of the main subject 708 can be set as the AGC region. Therefore, the focus detection unit 210 can perform further appropriate accumulation control compared to the focus detection carried out last time, thereby acquiring a further accurate result of the focus detection.

Flow of Determination of Main Subject and Setting of AGC Region

Figure 8:
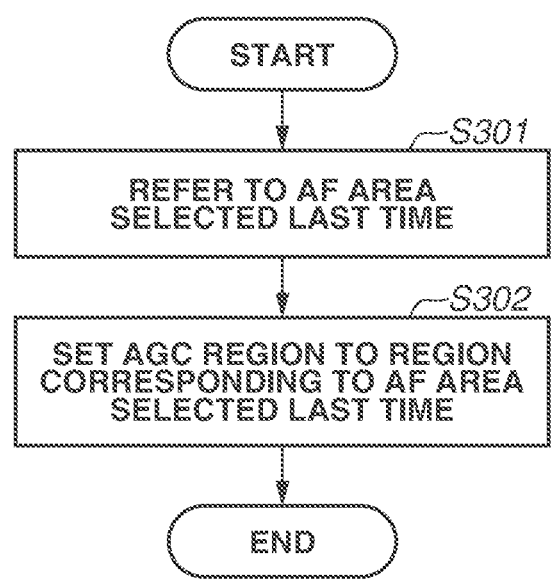
FIG. 8 is a flowchart illustrating a determination of the main subject and the setting of the AGC region according to the second exemplary embodiment.

FIG. 8 is a flowchart illustrating the determination of the main subject and the setting of the AGC region according to the second exemplary embodiment.

In step S301, the microcomputer 221 refers to the AF area selected when the focus detection has been carried out last time. This is because the main subject 708 is highly likely to be located in the AF area selected based on the result of the focus detection carried out last time.

In the next step, step S302, the microcomputer 221 sets the AGC region corresponding to the AF area that the microcomputer 221 has referred to in step S301.

Effect of Second Exemplary Embodiment

In the above-described manner, in the second exemplary embodiment, the AGC region is set in correspondence with the AF area selected when the focus detection has been carried out last time. The AF area selected when the focus detection has been carried oat last time is an AF area where the main subject is highly likely to be also located at the time of the next signal accumulation control. Therefore, by setting the AGC region corresponding to the AF area, the focus detection unit 210 can perform the signal accumulation control further suitable to carry out the focus detection with respect to the main subject, thereby acquiring the further accurate result of the focus detection with respect to the main subject.

Exemplary Modification

The operation illustrated in FIG. 8 can also be employed in a case where the focus detection is carried out a plurality of times across frames during the continuous imaging. For example, one conceivable application in a case where the focus detection is carried out twice across frames during the continuous imaging will be described now. When the focus detection carried out for the first time corresponds to processing performed in step S301 and the setting of the AGC region made when the focus detection is carried out for the second time corresponds to processing performed in step S302, the AGC region to be set when the focus detection is carried out for the second time is set to the region in the line sensor that corresponds to the AF area selected when the focus detection has been carried out for the first time. By being set in this manner, the AGC region can be further appropriately set with respect to the main subject when the focus detection is carried out for the second time.

In the following description, a third exemplary embodiment will be described. The third exemplary embodiment will be described, omitting a similar description to the first exemplary embodiment and focusing on a difference from the first exemplary embodiment.

The third exemplary embodiment will be described referring to an example in which the camera is configured similar to the second exemplary embodiment, but captures the image in the mode of carrying out the continuous imaging while targeting the subject located at the continuously changing imaging distance, i.e., the so-called SERVO mode.

Imaging during Continuous Imaging

FIG. 9 is a flowchart illustrating an imaging operation during the continuous imaging.

In step S400, the microcomputer 221 performs control so as to flip down the mirror 205.

In the present flow, step S401 to step S408 are performed while the mirror 205 stays down. Step S401, S402, S403, S404, S405, S406, S407, to step S408 are similar operations to steps S101 through S108 illustrated in FIG. 3, and therefore descriptions thereof will be omitted here.

After the driving of the lens is ended in step S408, the processing proceeds to step S409, in which the mirror 205 is driven to be flipped up. In step S410, the imaging is carried out.

After the imaging is ended in step S410, the processing proceeds to step S411, in which the microcomputer 221 determines whether SW2 is turned on. If the microcomputer 221 determines that SW2 is turned on in step S411 (YES in step S411), the processing proceeds to step S400, from which the processing transitions to a next imaging operation sequence. On the other hand, if the microcomputer 221 determines that SW2 is not turned on in step S411 (NO in step S411), the present flow is ended.

Determination of Main Subject and Setting of AGC Region

In the third exemplary embodiment, the microcomputer 221 predicts an AF area corresponding to a future position of the subject based on the previously employed. AF area in the determination of the main subject, and sets a region in the line sensor that corresponds to the predicted AF area as the AGC region.

Figure 10A:
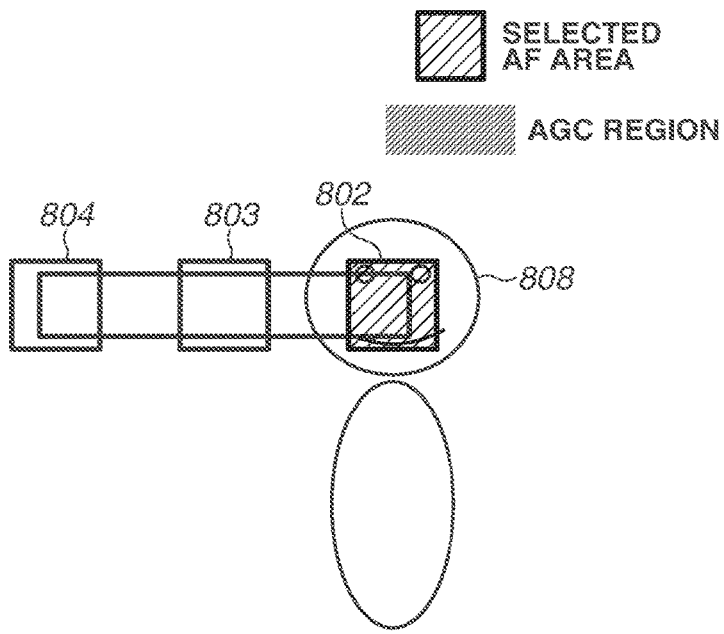
FIGS. 10A, 10B, and 10C illustrate a setting of the AGC region according to the third exemplary embodiment.
Figure 10B:
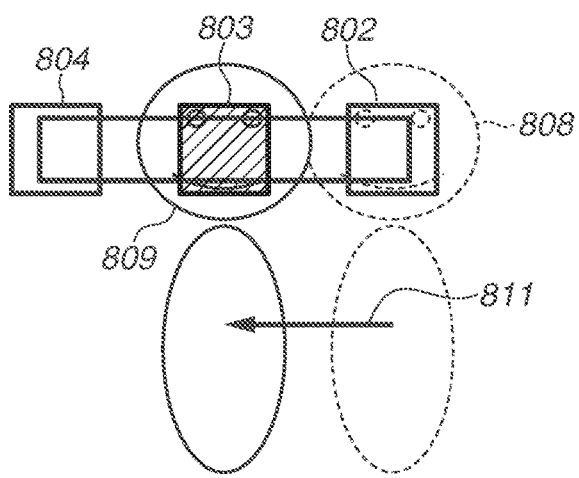
Figure 10C:
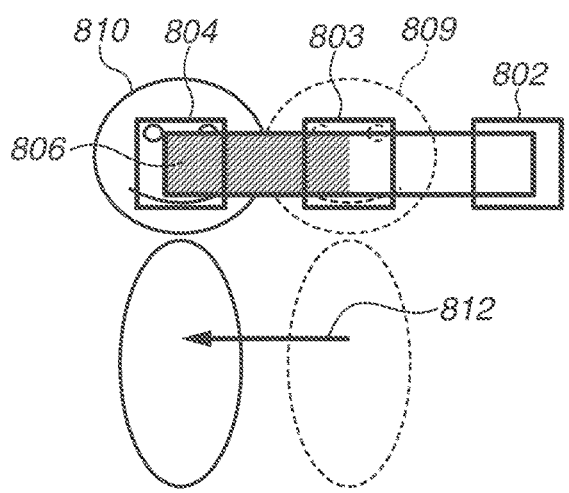

FIGS. 10A, 10B, and 10C illustrate a method for setting the AGC region in the line sensor. FIG. 10A illustrates an AF area selected by the microcomputer 221 when the focus detection has been carried out the time before last. When the focus detection has been carried out the time before last, a main subject 808 has been located at a position corresponding to a right AF area 802, and therefore the AF area 802 has been selected. In FIG. 10B, the main subject 808 located at the position corresponding to the AF area 802 in FIG. 10A has moved to a position corresponding to an AF area 803 (809) when the focus detection has been carried out next, i.e., the focus detection has been carried out last time. For this reason, the AF area 803 has been selected by the microcomputer 221.

When the subject moves, the selected AF area is also changed in this manner, so that the microcomputer 221 predicts the AF area that should be selected next based on the previously selected AF area. More specifically, the microcomputer 221 acquires a central position of the AF area 802 selected the time before last and a central position of the AF area 803 selected last time, and calculates a motion vector 811 from them. A method of calculating the motion vector is a known technique, and therefore a description thereof will be omitted herein. The motion vector indicates a movement direction and a movement amount of the subject on the imaging screen.

Next, the microcomputer 221 calculates a motion vector 812 of the subject 808 from the focus detection carried out last time (FIG. 10B) to the focus detection carried out this time (FIG. 10C) from the above-described motion vector 811. Then, the microcomputer 221 (a prediction unit) predicts which AF area the subject 810 would approach when the focus detection is carried out this time (FIG. 10C), based on the motion vector 812.

For example, supposing that a time period since when the focus detection has been carried out the time before last until when the focus detection has been carried out last time is T, and a time period since when the focus detection has been carried out last time until when the focus detection is carried out this time is also T, how the processing proceeds in this case will be described now. Hypothetically supposing that the subject 808 is moved on the imaging screen at a constant speed, the motion vector calculated when the focus detection has been carried out the time before last and when the focus detection has been carried out last time, and the motion vector calculated when the focus detection has been carried out last time and when the focus detection is carried out this time are equal to each other. It is assumed that the AF area predicted in this case is an AF area 804. The focus detection unit 210 can carry out the focus detection calculation with use of the image signal acquired from the accumulation control appropriate for the main subject 808 when the focus detection is carried out this time (FIG. 10C), by setting a region 806 in the line sensor that corresponds to the predicted AF area 804 as the AGC region.

Flow of Determination of Main Subject and Setting of AGC Region

Figure 11:
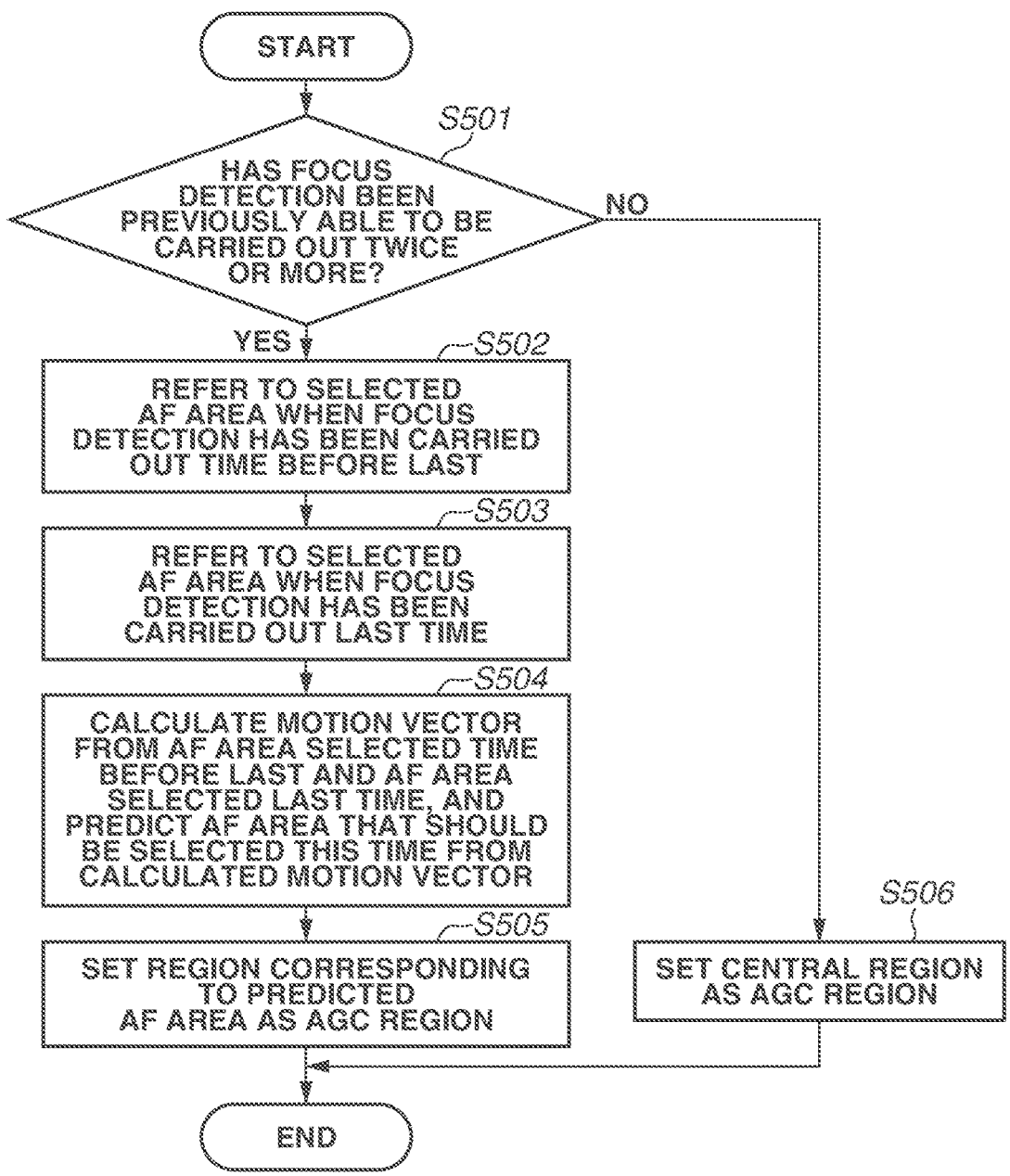
FIG. 11 is a flowchart illustrating a determination of the main subject and the setting of the AGC region according to the third exemplary embodiment.

FIG. 11 illustrates the determination of the main subject and the setting of the AGC region in step S401 illustrated in FIG. 9 according to the third exemplary embodiment in a flowchart.

In step S501, the microcomputer 221 determines whether the focus detection has been previously able to be carried out. twice or more. If the microcomputer 221 determines that the focus detection has been previously able to be carried out twice or more in step S501 (YES in step S501), the processing proceeds to step S502. On the other hand, if the focus detection has not been previously able to be carried out twice or more (NO in step S501), the processing proceeds to step S506, in which the microcomputer 221 sets the central region in the line sensor as the AGC region. Then, the present flow is ended.

In step S502, the microcomputer 221 refers to the AF area selected the time before last.

Next, in step S503, the microcomputer 221 refers to the AF area selected last time.

Next, in step S504, the microcomputer 221 calculates the motion vector based on the AF area selected the time before last and the AF area selected last time, and predicts the AF area that should be selected this time. In step S505, the microcomputer 221 sets the region corresponding to the AF area predicted in step S504 as the AGC region because the subject, is highly likely to be located in the selected AF area predicted in step S504. Then, the present flow is ended.

Effect of Third Exemplary Embodiment

In the above-described manner, in the third exemplary embodiment, the selection AF area is predicted based on the plurality of previously selected AF areas. This processing reduces an error between the predicted movement direction and movement amount and the actual movement amount of the subject on the imaging screen, thereby allowing a further suitable region in the line sensor to be set as the AGC region. The focus detection unit 210 can acquire the signal further suitable to the focus detection by performing the signal accumulation control based on the light reception amount in the AGC region.

In the following description, a fourth exemplary embodiment of the present disclosure will be described. In the fourth exemplary embodiment, the setting of the AGC region described in the first exemplary embodiment or the second exemplary embodiment is employed in the above-described SERVO mode.

Figure 12:
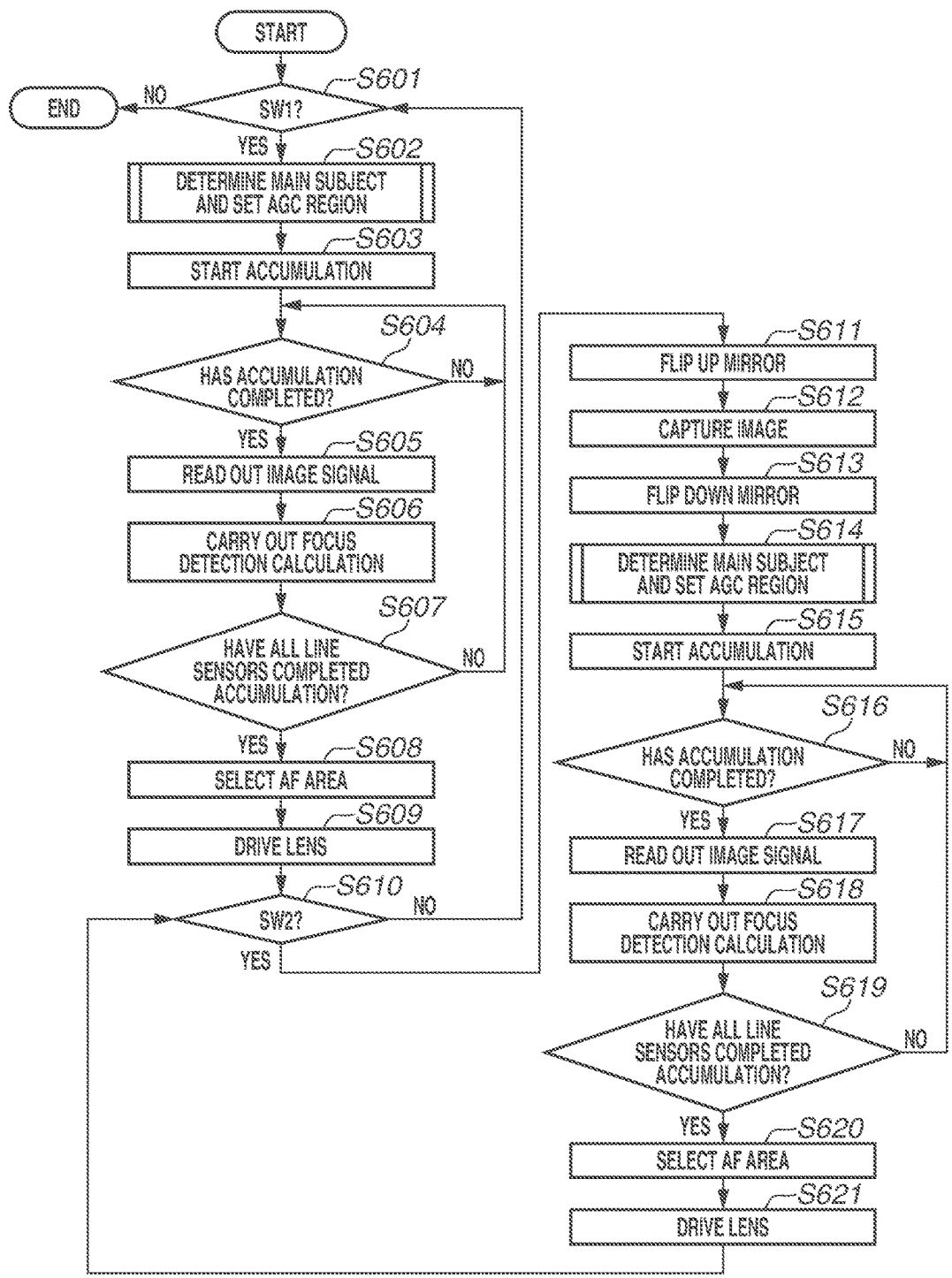
FIG. 12 is a flowchart illustrating an imaging operation according to a fourth exemplary embodiment.

FIG. 12 is a flowchart when SW1 is held and while the continuous imaging is carried out (when SW2 is held) in the SERVO mode.

In step S601, the microcomputer 221 determines whether SW1 is held. If SW1 is held (YES in step S601), the processing proceeds to the settings of the main subject and the AGC region in step S602. If SW1 is not held (NO in step S601), the processing ends.

Figure 3:
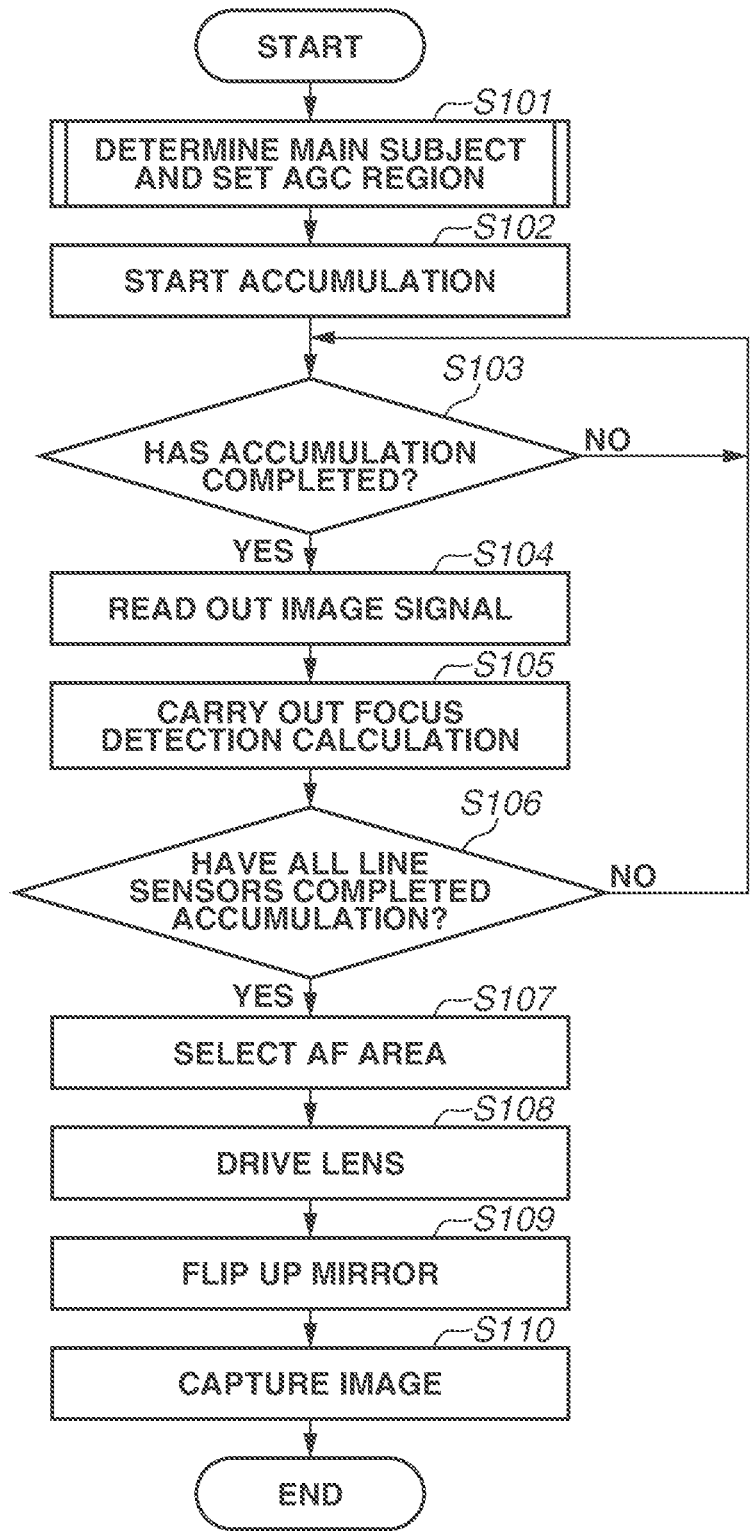
FIG. 3 is a flowchart illustrating an imaging operation according to a first exemplary embodiment.

Operations from step S602, S603, S604, S605, S606, S607, S608, to step S609 are similar to the operations from step S101 through step S108 illustrated in FIG. 3, and therefore descriptions thereof will be omitted here.

In step S610, the microcomputer 221 determines whether SW2 is pressed. If SW2 is not pressed (NO in step S610), the processing returns to step S601, and step S601 to step S609 are repeated. If SW2 is pressed (YES in step S610), the processing proceeds to step S611 so as to transition to the continuous imaging.

In step S611, the microcomputer 221 performs control so as to flip up the main mirror 205. Then, in step S612, the microcomputer 221 performs control so as to carry out the imaging. After the imaging is ended in step S612, the processing proceeds to step S613.

In step S613, the microcomputer 221 performs control so as to flip down the main mirror 205. Then, the processing proceeds to step S614.

Operations from step S614, S615, S616, S617, S618, S619, S620, to step S621 are similar to the operations from step S602 through step S609, and therefore descriptions thereof will be omitted here. After step S621 is ended, the processing returns to step S610, from which the processing transitions to a next imaging by repeating step S610 to step S621.

In the following description, a fifth exemplary fifth exemplary embodiment will be described, referring to an example in which the method of setting the AGC region is switched according to an AF area selection mode, with reference to FIGS. 13A to 14.

In the present, exemplary embodiment, the camera has three AF area selection modes, namely, an arbitrary selection mode, a zone selection mode, and an automatic selection mode. FIGS. 13A, 13B, and 13C illustrate the selection of the AF area and the setting of the AGC region in each of the AF area selection modes.

Figure 13A:
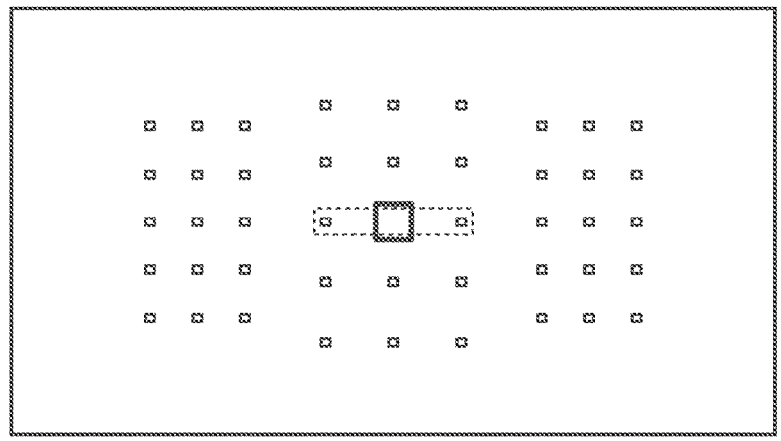
FIGS. 13A, 13B, and 13C illustrate a selection of the AF area and a setting of the AGC region in each AF area selection mode.
Figure 13B:
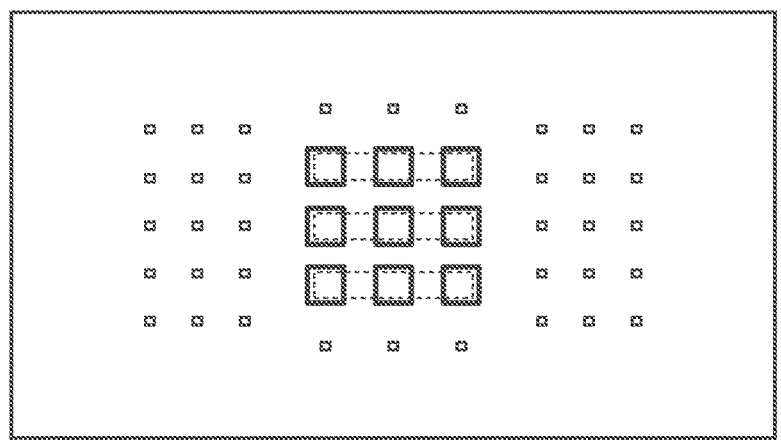
Figure 13C:
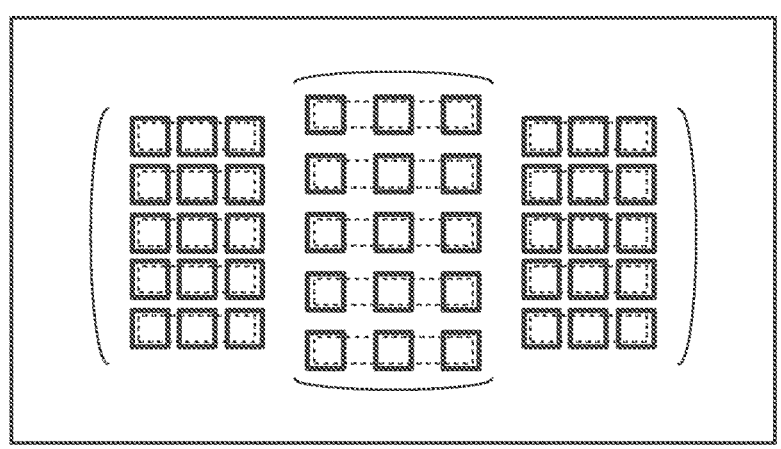
Figure 14:
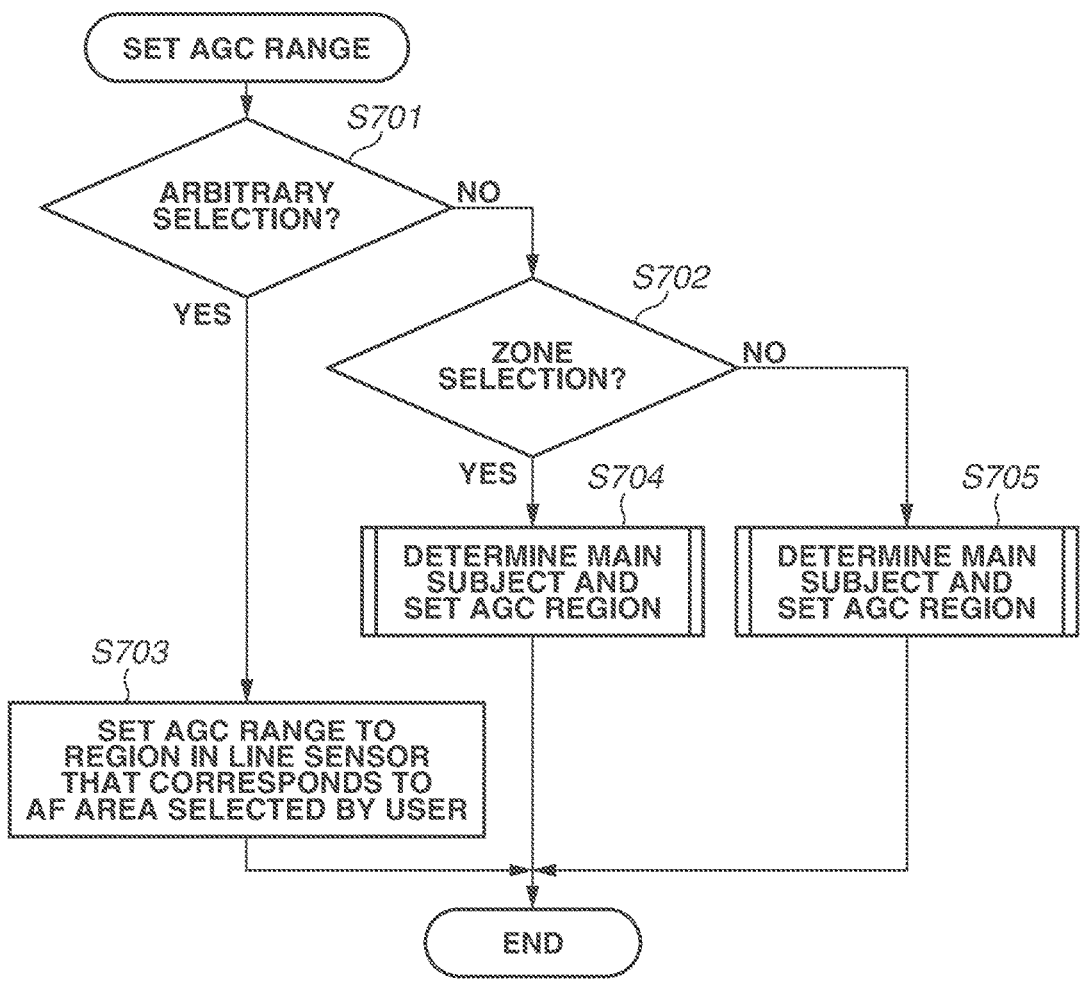
FIG. 14 illustrates processing for setting the AGC region according to the AF area selection mode.

FIG. 13A illustrates an example of the selection of the AF area in the arbitrary selection mode. In the arbitrary selection mode, the user selects the AF area. The user can select one AF area in the arbitrary selection mode. Therefore, the focus detection unit 210 can carry out the appropriate AGC control corresponding to the position of the subject by setting the AGC region so as to overlap the AF area selected by the user in the arbitrary selection mode.

FIG. 13A illustrates an example in which the user selects the AF area corresponding to the central region in the line sensor. In this case, the central region in the line sensor is set as the AGC region.

FIG. 13B illustrates an example of the selection of the AF area in the zone selection mode. In the zone selection mode, the user selects a zone (a region) containing a plurality of AF areas, and the microcomputer 221 selects an AF area suitable to focus on from among the AF areas contained in the zone. FIG. 13B illustrates an example in which a zone containing central nine AF areas is selected by the user.

In FIG. 13B, the microcomputer 221 sets, as the AGC region, a region corresponding to the position of the subject in a line sensor corresponding to the position of the subject that, the user wants to image from among line sensors corresponding to the nine AF areas contained in the zone selected by the user.

FIG. 13C illustrates an example of the selection of the AF area in the automatic selection mode. In the automatic selection mode, the microcomputer 221 selects an AF area suitable to focus on from among all AF areas.

The microcomputer 221 sets, as the AGC region, a region corresponding to the position of the subject in a line sensor corresponding to the position of the subject that the user wants to image from among line sensors corresponding to all the AF areas illustrated in FIG. 13C.

In the above-described manner, in the present exemplary embodiment, the region in the line sensor that corresponds to the AF area selected by the user is set as the AGC region in the arbitrary selection mode. On the other hand, in the case where there is a plurality of usable AF areas like the zone selection mode and the automatic selection mode, the region corresponding to the position of the subject in the line sensor corresponding to the position of the subject that the user wants to image from among the line sensors corresponding to the AF areas is set as the AGC region. This is because the appropriate AGC region may be changed depending on the position of the subject since the subject that the user wants to image is expected to be moved across the usable AF areas.

Processing for setting the AGC region according to the AF area selection mode will be described with reference to a flowchart illustrated in FIG. 14. In the present exemplary embodiment, the processing illustrated in FIG. 14 is performed in place of step S101 illustrated in FIG. 3, step S401 illustrated in FIG. 9, and step S602 illustrated, in FIG. 12. Then, the processing illustrated in any of FIGS. 6, 8, and 11 is employed in steps S704 and S705 in the present exemplary embodiment.

In step S701, the microcomputer 221 determines whether the AF area selection mode is the arbitrary selection selection mode (YES in step S701), the processing proceeds to step S703, in which the microcomputer 221 sets the region in the line sensor that corresponds to the AF area selected by the user, as the AGC region.

If the AF area selection mode is not the arbitrary selection mode (NO in step S701), the processing proceeds to step S702, in which the microcomputer 221 determines whether the AF area selection mode is the zone selection mode. If the AF area selection mode is the zone selection mode (YES in step S702), the processing proceeds to step S704, in which the microcomputer 221 sets, as the AGC region, the region in the line sensor that corresponds to the position of the subject among the line sensors corresponding to the plurality of AF areas contained in the selected zone. For example, the processing described with reference to any of FIGS. 6, 8, and 11 can be employed as a method for determining the region in the line sensor that corresponds to the position of the subject.

On the other hand, if the AF area selection mode is not the zone selection mode (NO in step S702), the processing proceeds to step S705. In step S705, the AF area selection mode is the automatic selection mode. The microcomputer 221 sets, as the AGC region, the region corresponding to the position of the subject in the line sensor corresponding to the position of the subject that the user wants to image from among the line sensors corresponding to all the AF areas. For example, the processing described with reference to any of FIGS. 6, 8, and 11 can be employed as a method for determining the region in the line sensor that corresponds to the position of the subject. cl Other Embodiments The camera may be configured to, with respect to a line sensor other than the line sensor in which the AGC region is set in the above-described exemplary embodiments, also set the AGC region based on this AGC region.

Figure 15A:
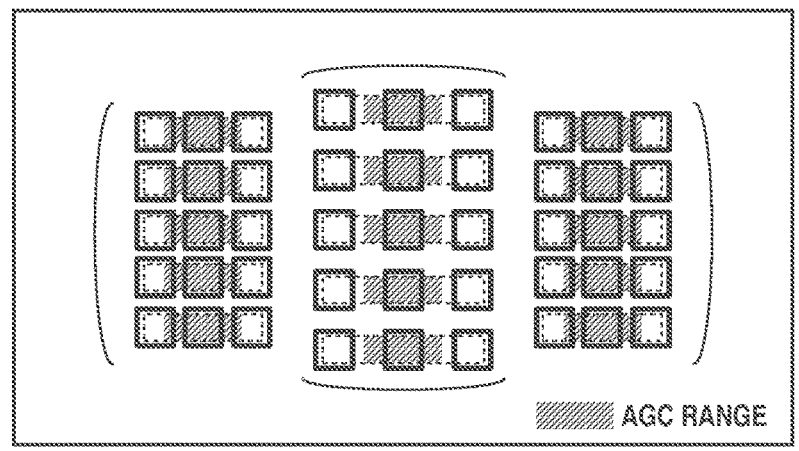
FIGS. 15A, 15B, and 15C each illustrate processing for setting the AGC regions in a plurality of line sensors.
Figure 15B:
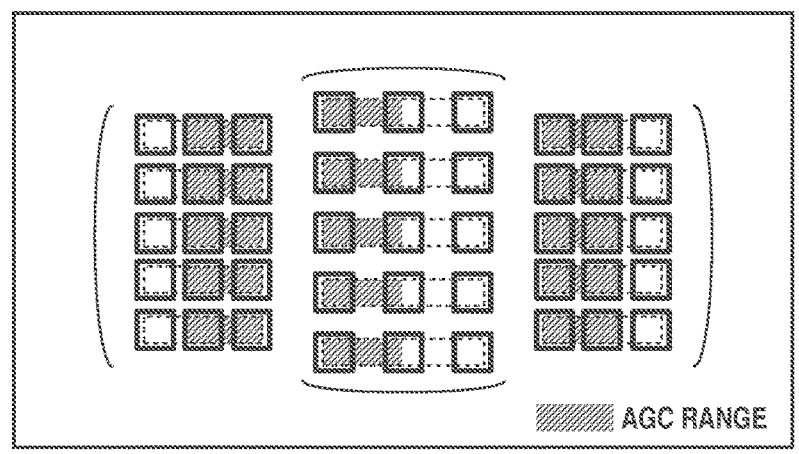
Figure 15C:
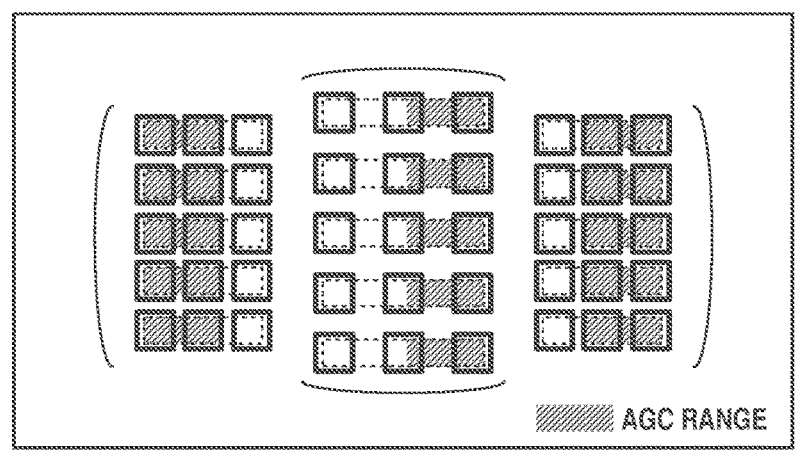

For example, if the AGC region is set to the center on one line sensor as illustrated in FIG. 15A, the AGC regions are also set to the centers with respect to the AGC regions of the other line sensors at the same time. Further, if the AGC regions are desired to be set to the left sides on the central line sensors, the AGC regions of the other line sensors are also set at the same time as illustrated in FIG. 15B. Similarly, if the AGC regions are desired to be set to the right sides on the central line sensors, the AGC regions of the other line sensors are also set at the same time as illustrated in FIG. 15C.

Having described representative exemplary embodiments of the present disclosure, the present disclosure is not limited to these exemplary embodiments, as it can be modified and changed in various manners within the range of the spirit thereof.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest reasonable interpretation so as to encompass all modifications and equivalent structures and functions.

This application claims the benefit of Japanese Patent Applications No. 2017-007239, filed Jan. 19, 2017, and No. 2017-234608, filed Dec. 6, 2017, which are hereby incorporated by reference herein in their entirety.

What is claimed is:

1. A focus detection apparatus comprising:
   a first image sensor including line sensors each having a plurality of photoelectric conversion elements and configured to receive a pair of different, light fluxes among light fluxes passing through an imaging optical system, to output an image signal;
   an accumulation control unit configured to control accumulation of the image signal by each of the line sensors;
   a focus detection unit configured to establish a correspondence of an AF area with each of a plurality of regions in each of the line sensors and detect a defocus amount of each of the plurality of regions based on the image signal of each of the plurality of regions; and a setting unit configured to set the region corresponding to a position of a subject that should be in focus among the plurality of regions, as a reference region for the control of the accumulation of the image signal by the accumulation control unit, wherein the focus detection unit detects the defocus amount based on the signal acquired from the control of the accumulation by the accumulation control unit, the control of the accumulation being based, on a light reception amount in the reference region set by the setting unit.

2. The focus detection apparatus according to claim 1, further comprising:

a second image sensor configured to receive and photoelectrically convert an image of a subject, and output an image signal; and a subject detection unit configured to detect the subject with use of the image signal output by the second image sensor, wherein the setting unit sets a region in each of the line sensors that corresponds to a position at which the subject detection unit detects the subject, as the reference region.

3. The focus detection apparatus according to claim 2, wherein the subject detection unit detects a position at which a skin color is detected, based on the image signal output from the second image sensor, as the position of the subject.

4. The focus detection apparatus according to claim 2, wherein the subject detection unit detects a position at which a face is detected, based on the image signal output from the second image sensor, as the position of the subject.

5. The focus detection apparatus according to claim 1, further comprising a selection unit configured to select an AF area based on the defocus amount detected by the focus detection unit, wherein the setting unit sets a region in each of the line sensors that corresponds to the AF area selected by the selection unit last time, as the reference region.

6. The focus detection apparatus according to claim 1, further comprising:

a selection unit configured to select an AF area based on the defocus amount detected by the focus detection unit; and a prediction unit configured to predict a next AF area based on an AF area selected last time and an AF area selected the time before last by the selection unit, wherein the setting unit sets a region in each of the line sensors that corresponds to the AF area predicted by the prediction unit, as the reference region.

7. The focus detection apparatus according to claim 6, further comprising a calculation unit configured to calculate a motion vector based on the AF area selected last time and the AF area selected the time before last by the selection unit, wherein the prediction unit selects the AF area based on the motion vector calculated by the calculation unit.

8. A method for controlling a focus detection apparatus including a first image sensor, the first image sensor including line sensors each having a plurality of photoelectric conversion elements and configured to receive a pair of different light fluxes among light fluxes passing through an imaging optical system, to output an image signal, the method comprising:

performing accumulation control of controlling accumulation of the image signal by each of the line sensors;

carrying out focus detection of establishing a correspondence of an AF area with each of a plurality of regions in each of the line sensors and detecting a defocus amount of each of the regions based on the image signal of each of the plurality of regions; and setting the region corresponding to a position of a subject that should be in focus among the plurality of regions, as a reference region for the control of the accumulation of the image signal in the accumulation control, wherein, in the focus detection, the defocus amount is detected based on the signal acquired from the control of the accumulation in the accumulation control based on a light reception amount in the reference region set in the setting.

9. A non-transitory computer-readable storage medium storing a program for causing a computer to perform each of the operations in the control method according to claim 8.

* * * * *